(12) United States Patent
Cho

(10) Patent No.: US 10,276,059 B2
(45) Date of Patent: Apr. 30, 2019

(54) METHOD AND SYSTEM FOR FACILITATING LEARNING OF CORRESPONDENCE BETWEEN SPELLING PATTERNS AND SPEECH SOUNDS

(71) Applicant: Yoonsung Cho, Pasadena, CA (US)

(72) Inventor: Yoonsung Cho, Pasadena, CA (US)

(*) Notice: Subject to any disclaimer, the term of this patent is extended or adjusted under 35 U.S.C. 154(b) by 132 days.

(21) Appl. No.: 15/296,789

(22) Filed: Oct. 18, 2016

(65) Prior Publication Data

US 2018/0108269 A1    Apr. 19, 2018

(51) Int. Cl.
*A63F 9/24* (2006.01)
*G09B 17/00* (2006.01)
*G09B 5/06* (2006.01)

(52) U.S. Cl.
CPC .............. *G09B 17/003* (2013.01); *G09B 5/06* (2013.01)

(58) Field of Classification Search
CPC ................................ G09B 17/003; G09B 1/16
See application file for complete search history.

(56) References Cited

U.S. PATENT DOCUMENTS

| | | | | |
|---|---|---|---|---|
| 4,030,211 A * | 6/1977 | McGinley | .............. | G09B 19/04 434/167 |
| 4,713,008 A * | 12/1987 | Stocker | .................. | G09B 17/00 283/46 |
| 5,429,513 A * | 7/1995 | Diaz-Plaza | .............. | G09B 1/00 273/302 |
| 5,953,692 A * | 9/1999 | Siegel | ............... | G06F 17/30017 434/167 |
| 6,077,080 A * | 6/2000 | Rai | .......................... | G09B 1/00 434/159 |
| 6,126,447 A * | 10/2000 | Engelbrite | ............. | G09B 19/06 434/167 |
| 2004/0115598 A1* | 6/2004 | Goodfriend | ............ | G09B 17/00 434/159 |
| 2006/0040242 A1* | 2/2006 | Mejia | ....................... | G09B 1/00 434/170 |
| 2012/0164611 A1* | 6/2012 | O | ............................. | G09B 5/06 434/167 |
| 2013/0143184 A1* | 6/2013 | Neikrug | ................. | G09B 19/00 434/169 |

* cited by examiner

*Primary Examiner* — Steve Rowland

(57) ABSTRACT

A method of facilitating learning of speech sounds is disclosed. The method may include generating, using a processor, a first plurality of sound-letter cards corresponding to a first set of phonemes. Further, each sound-letter card may include a speech sound and a spelling pattern. Furthermore, the generating may be based on one or more of a first criterion and a second criterion. According to the first criterion, the spelling pattern corresponding to a speech sound of a letter may include letters corresponding to a phoneme associated with the letter followed by schwa sound. According to the second criterion, the spelling pattern may include a plurality of letters, located at an onset position, corresponding to a phoneme associated with the speech sound. The method may further include displaying, using a display device, one or more of the first plurality of sound-letter cards based on a predetermined lesson plan.

17 Claims, 17 Drawing Sheets
(12 of 17 Drawing Sheet(s) Filed in Color)

METHOD AND SYSTEM FOR FACILITATING LEARNING OF CORRESPONDENCE BETWEEN SPELLING PATTERNS AND SPEECH SOUNDS

FIELD OF THE INVENTION

Generally, the disclosure relates to facilitating teaching and/or learning a natural language. More specifically, the disclosure relates to methods and systems for facilitating learning of correspondence between spelling patterns and speech sounds.

BACKGROUND

Imparting knowledge about reading and writing a language to a child requires elementary teaching methodologies which aim to deal with learning about distinct sound pattern associated with each letter. A pre-school child falling under the age group of three to five years cannot read written text until he/she learns that how to pronounce each letter in a word. Hence, a method of phonics is used to help learn the language while using phonetics (sounds) of each letter or word that is formed. The word phonics is the preferred method for imparting knowledge about the sounds of letters and letter groups to beginners so they can proficiently read, spell and pronounce new words. Taking the case of the English language, there are pre-defined rules which determine the sounds of the letters and the letter groups.

In the current English phonics method, 44 English phonemes are preferably used to represent distinct sound patterns that can be applied to form distinguished words having distinct sound patterns. For example, the English words "hot" and "hat" are distinguished by the phoneme /o/ and the phoneme /a/ along with /h/ and /t/. However, it has been observed that in an earlier stage of the English language learning process, a learner may find difficulty to grasp 44 phonemes and their respective meanings because of irregularities in spelling of a word and its respective sounds. For example, father should phonetically spelled "fother". To impart better learning techniques, there may be a need of the phonics system to minimize the number of phonemes to an appropriate number and use age appropriate pictures on top of the letters (in particular, the first two letters of the consonant-vowel-consonant words like "hat"). Further, in the current English phonics method, the preference is given to a correct spelling of the word while teaching the sound pattern of the word. This sometimes creates confusing outcomes and the level of understanding may become open-ended. For example, the English word "word" may be used in the current phonics method to describe an r-controlled "ur" sound which may be slightly confusing to the learner since it can be spelled phonetically spelled as either "werd", "wird" or "wurd".

Hence, there is a need for the system and method to define the sound patterns of the sound-spelling entity in an accurate, systematic, and readable manner so that the beginner may proficiently learn the elementary English language while deciphering the correct pronunciation of each word comprising one or more phonemes. In other words, a letter or groups of letters in a given context should not have more than one sound where as in English, the letter or the same group of letters can have multitude of sounds and there is no particular rationale why it should be that way.

SUMMARY

According to some embodiments, a method of facilitating learning of correspondence between spelling patterns and speech sounds is disclosed. The method may include generating, using a processor, a first plurality of sound-letter cards corresponding to a first set of phonemes with a schwa sound which is close to a short "u" sound as in the letter /u/ sound in under, sun, fun and etc. For example, try saying the nonsense word "stp". The IMPLICIT letter that is inserted in pronouncing "stp" is "stup" and not "stap", stip, step, stop that reinforce this implicit "u" sound as in fun instead of". Therefore, this system recognizes that sound spelling cards should consist of pictures fan like in other systems. Other systems may use a picture of a bat to represent the /B/ sound, but this system uses a bus instead because short /u/ sound is the most natural sound that comes when pronouncing any consonant letter. Additionally, each phoneme in the first set may be represented by a single letter of the English alphabet. Further, each sound-letter card may include a speech sound and a spelling pattern. Furthermore, the generating may be based on one or more of a first criterion and a second criterion. Further, according to the first criterion, the spelling pattern corresponding to a speech sound of a letter may include letters corresponding to a phoneme associated with the letter followed by schwa sound. Furthermore, according to the second criterion, the spelling pattern of a speech sound may include a plurality of letters corresponding to a phoneme associated with the speech sound. Additionally, the plurality of letters may be located at an onset position in the spelling pattern. The method may further include displaying, using a display device, one or more of the first plurality of sound-letter cards based on a predetermined lesson plan.

According to some other embodiments, a system for facilitating learning of correspondence between spelling patterns and speech sounds is disclosed. The system may include a processor configured for generating a first plurality of sound-letter cards corresponding to a first set of phonemes. Additionally, each phoneme in the first set may be represented by a single letter of the English alphabet. Further, each sound-letter card may include a speech sound and a spelling pattern. Furthermore, the generating may be based on one or more of a first criterion and a second criterion. Further, according to the first criterion, the spelling pattern corresponding to a speech sound of a letter may include letters corresponding to a phoneme associated with the letter followed by schwa sound. Furthermore, according to the second criterion, the spelling pattern of a speech sound may include a plurality of letters corresponding to a phoneme associated with the speech sound. Additionally, the plurality of letters may be located at an onset position in the spelling pattern. The system may further include a display device configured for displaying one or more of the first plurality of sound-letter cards based on a predetermined lesson plan. Simply put, once the 44 phonemes are mastered, 3 letter words of CVC pattern are broken down in the onset position as CV/C rather than C/VC. This is of critical importance for two reasons. Breaking the word at the CV/C level allows the student to read a word like bat as "ba" and even though the "t" in the bat is NOT pronounced, it is easily implied for the listener in the context of a conversation. As an example, if I only say "ba" pointing to a bag, the listener will implicitly assert the letter "g". If we are in the context of talking about baseball and I say "How is your new ba?" rapidly in normal speech velocity, the listener will have no problem comprehending the sentence because they will implicitly assert the letter "t" in the to make it a "bat" in their mind. Secondly, the advantage of having this CV/C break is to place picture that corresponds to the onset(front) CV part. As an example, we draw a cat on top of /Ca/ to represent EVERY instance where a word might start with "ca". It could be cab, can, cash, cat, Cal, and etc. Therefore, these pictures help the student make an association of that sound with the picture on top. Initially, students will be looking more at the pictures rather than reading the "ca" rather than sounding out c-a-t individually like other programs. This picture of CV streamlines the process much faster and it is more logical. A potential concern may be that children rely too heavily on the pictures rather than reading. The response to that will be two fold. First, as children get accustomed to the CV combinations with the pictures, once they make the connection, the pictures are no longer needed even after a week or less. Second, there are ANTHROPOMORPHIC letters that don't have separate pictures on top of the letters to help sound the letters or CV combinations. Instead, these ANTHROPOMORPHIC letters integrate the sound with the shape of the letter itself and it is "morphed" or embedded. An example for /ca/ would be the picture of the letter "c" with teeth at top and bottom sticking out to emulate the opened mouth of a cat.

BRIEF DESCRIPTION OF DRAWINGS

The patent of application file contains at least one drawing executed in color. Copies of this patent or patent application publication with color drawing(s) will be provided by the office upon request and payment of the necessary fee.

DETAILED DESCRIPTION

Figure 1:
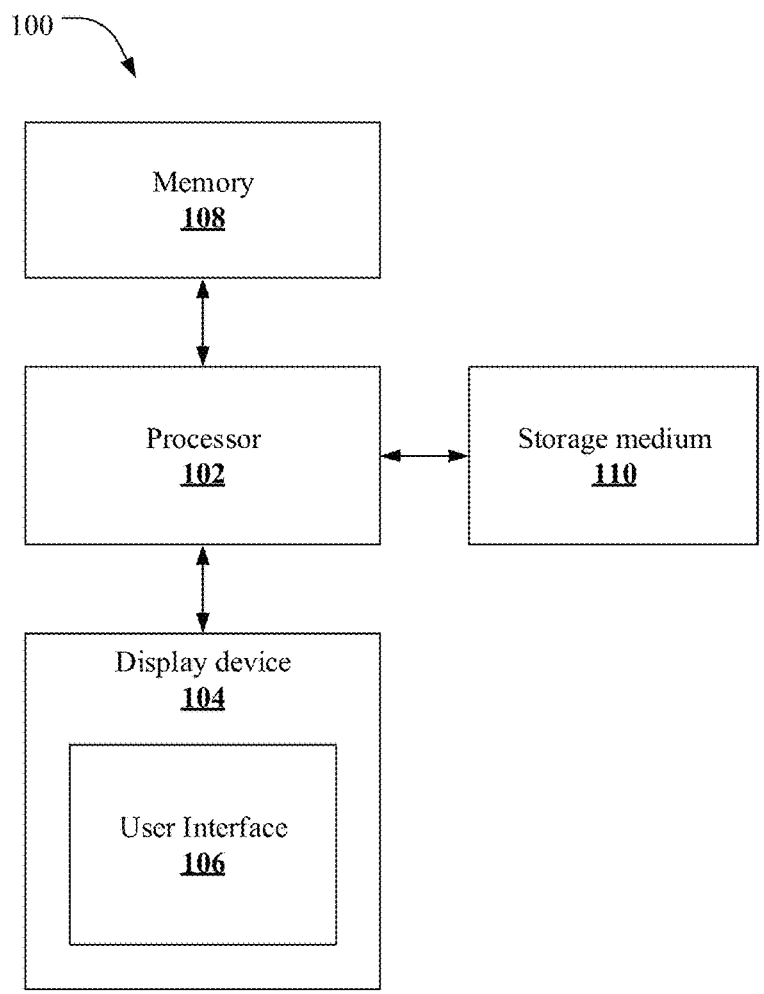
FIG. 1 illustrates a block diagram of a system for facilitating learning of correspondence between speech sounds and spelling patterns, in accordance with some embodiments.

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary.

OVERVIEW

According to some embodiments, a method of facilitating learning of correspondence between spelling patterns and speech sounds is disclosed. The method may include generating, using a processor, a first plurality of sound-letter cards corresponding to a first set of phonemes. Additionally, each phoneme in the first set may be represented by a single letter of the English alphabet. Further, each sound-letter card may include a speech sound and a spelling pattern. Furthermore, the generating may be based on one or more of a first criterion and a second criterion. Further, according to the first criterion, the spelling pattern corresponding to a speech sound of a letter may include letters corresponding to a phoneme associated with the letter followed by schwa sound. Furthermore, according to the second criterion, the spelling pattern of a speech sound may include a plurality of letters corresponding to a phoneme associated with the speech sound. Additionally, the plurality of letters may be located at an onset position in the spelling pattern. The method may further include displaying, using a display device, one or more of the first plurality of sound-letter cards based on a predetermined lesson plan.

In some embodiments, the method may further include generating, using the processor, a second plurality of sound-letter cards corresponding to a second set of phonemes. Additionally, each phoneme of the second set of phonemes may be one or more of a digraph, a trigraph and an r-controlled vowel. Additionally, each sound-letter card of the second plurality of sound-letter cards may include each of a speech sound and a spelling pattern. Accordingly, the method may further include displaying, using the display device, one or more of the second plurality of sound-letter cards based on the predetermined lesson plan.

In some embodiments, the displaying may include de-emphasizing a visual characteristic of at least one redundant letter in the spelling pattern. Additionally, the at least one redundant letter has no role in pronunciation of the spelling pattern.

In some embodiments, the visual characteristic may include a font size.

In some embodiments, the method may further include generating, using a processor, a third plurality of sound-letter cards. Additionally, each sound-letter card of the third plurality of sound-letter cards may include a word and a spelling pattern. In some embodiments, the word may include a short vowel. Additionally, the word conforms to a consonant-vowel-consonant (CVC) form. Additionally, the spelling pattern may include a plurality of letters representing a blending of speech sounds associated with consonant-vowel (CV) part of the CVC form; and displaying, using the display device, one or more of the third plurality of sound-letter cards based on the predetermined lesson plan.

In some embodiments, the third plurality of sound-letter cards may include a first set of sound-letter cards, a second set of sound-letter cards and a third set of sound-letter cards. Additionally, each word in the first set of sound-letter cards may include a short "a". Additionally, each word in the second set of sound-letter cards may include a short "i".

Additionally, each word in the third set of sound-letter cards may include one or more of a long vowel and an r-controlled vowel. Additionally, the displaying may include displaying the first set of sound-letter cards, the second set of sound-letter cards and the third set of sound-letter cards in a time order. Additionally, displaying of the first set of sound-letter cards precedes displaying of each of the second set of sound-letter cards and the third set of sound-letter cards.

In some embodiments, the displaying of a plurality of sound-letter cards from a selected set of sound-letter cards may be performed randomly. Additionally, the selected set of sound letter cards may be one or more of the first set of sound-letter cards, the second set of sound-letter cards and the third set of sound-letter cards.

In some embodiments, the displaying may include displaying one or more of the speech sound and the spelling pattern based on a control input received from one or more of a learner interface and a teacher interface.

In some embodiments, the method may further include displaying a spelling template including a plurality of symbols selected from the group consisting of a space, a slash, a square and an arrow. Additionally, a symbol of the plurality of symbols visually indicates a separation between two syllables.

In some embodiments, the method may further include displaying, using the display device, at least one picture associated with at least one spelling pattern of the one or more of the first plurality of sound-letter cards. Additionally, the at least one picture facilitates pronunciation of the at least one spelling pattern.

In some embodiments, the spelling pattern may include a misspelling of a corresponding word.

In some embodiments, the spelling pattern may include a plurality of misspellings of the corresponding word.

In some embodiments, displaying the third plurality of sound-letter cards may include alternately displaying words with different consonants but a common short vowel.

In some embodiments, the generating may be based further on a third criterion. Additionally, according to the third criterion the spelling pattern corresponds to a high frequency word.

In some embodiments, the method may further include displaying each of a correct phoneme and an incorrect phoneme. Additionally, the spelling template may include at least one blank space. Additionally, the method further may include receiving a phoneme selection input from a learner interface corresponding to one of the correct phoneme and the incorrect phoneme to complete the at least one blank space.

In some embodiments, the spelling pattern may include visually offset groups of letters associated with syllables of a corresponding word in order to show the separation of syllables within the word.

The present disclosure will be further illustrated with examples as follows. FIG. 1 illustrates a block diagram depicting a learning system 100 to facilitate learning of correspondence between spelling patterns and speech sounds. The learning system 100 may include a processor 102, a display device 104, a user interface 106, a memory 108, and a storage medium 110. The processor 102 may be for example, but not limited to, AMD Sempron, Intel Celeron, AMD Athlon 64, Pentium 4, Dual-core, AMD Athlon 64 X2, Intel Pentium D, Intel i3, Intel i5, Intel i7, AMD A6, AMD A8, and AMD A10. The processor 102 may be in communication with the display device 104 through a hardware circuitry to display one or more sound-letter cards generated by the learning system 100. Accordingly, the display device 104 may include, for example, but not limited to, an LED display, LCD display, plasma display and so on.

In accordance with an embodiment, the processor 102 may be configured to execute an array of instructions that may be stored in the memory 108. The memory 108 may be a random access memory (RAM) which may fall under various categories such as, but not limited to, DRAM, SRAM, and DRDRAM. Further, the memory 108 may be configured to store temporary data upon the processing of instructions by the processor 102. The instructions executable by the processor 102 may be fetched from the storage medium 110. Accordingly, the storage medium 110 may be configured to store instructions that, when executed by the processor 102, causes the processor 102 to generate the one or more sound-letter cards, in accordance with various embodiments.

Figure 2:
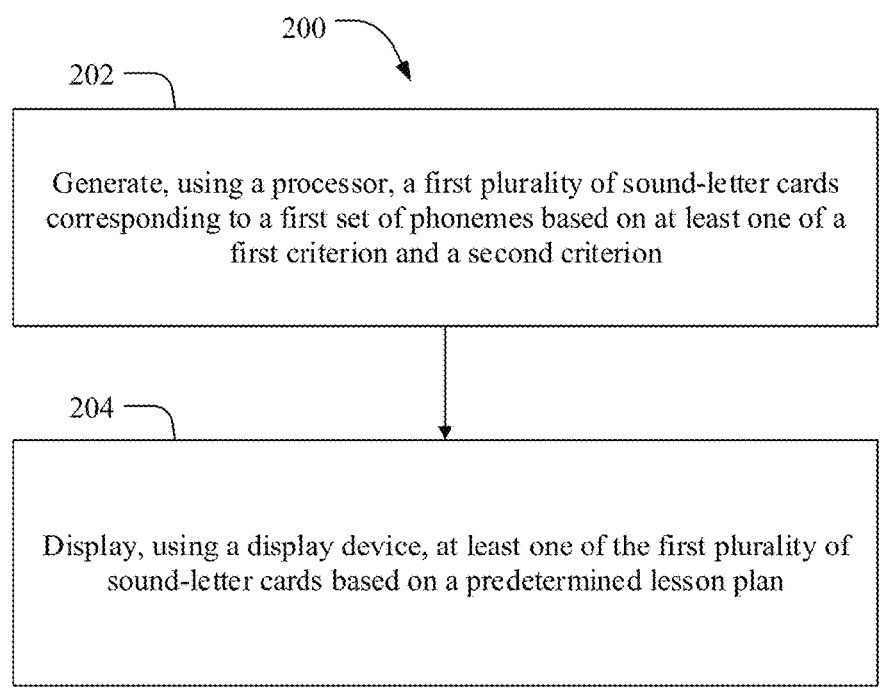
FIG. 2 illustrates a flowchart depicting a method 200 of facilitating learning of correspondence between speech sounds and spelling patterns, in accordance with some embodiments.

Referring to FIG. 2, illustrated therein is a flowchart 200 depicting a method performable by the learning system 100, in accordance with an embodiment. In some instances, the learning system 100 may be configured to display one or more sound-letter cards on the display device 104 based on an input provided to the user interface 106. The user interface 106 may include one or more of a teacher interface and a learner interface. Accordingly, in some embodiments, the display device 104 may be configured to present one or more of the teacher interface and the learner interface. For example, a teacher may operate a computer comprising the display device 104 while one or more learners may operate, for example, a tablet computer comprising the display device 104.

The one or more sound-letter cards may include each of a speech sound and a spelling pattern associated with the speech sound. The speech sound may include one or more sets of discrete sounds corresponding to the spelling pattern. Further, the spelling pattern may include one or more of letters corresponding to a phoneme associated with the speech sound. A phoneme is the smallest and unique unit in the sound system of a language.

Accordingly, the method 200 may include a step 202 of generating, using the processor 102, a first plurality of sound-letter cards corresponding to a first set of phonemes. Each phoneme in the first set of phonemes may be represented by a single letter of the English alphabet. Further, each sound-letter card may include a speech sound and a spelling pattern.

In an instance, the first plurality of sound-letter cards may correspond to the 25 phonemes corresponding to single letters of the English alphabet. Accordingly, in some embodiment, the learning system 100 may be configured to initially facilitate learning of these 25 phonemes which may exclude, for example, difficult phonemes such as the "qu" phoneme. The "Qu" phoneme may be treated similarly as a digraphs or r-controlled vowels. Consequently, the learning system 100 provides improvement over a traditional learning system by initially focusing on facilitating learning of these 25 phonemes starting from "a" through "z".

In some embodiments of the present disclosure, the step 202 of generating the first plurality of sound-letter cards may be based on a first criterion and a second criterion. According to the first criterion, the spelling pattern corresponding to a speech sound of a letter includes letters corresponding to a phoneme associated with the letter followed by schwa sound. For example, each word in the first plurality of sound-letter cards may include the schwa sound or the short "u" sound. This is because the short "u" sound is the most natural sound a person makes without altering lips, tongue or jaw. While traditional learning systems may use the word "ball" to refer to the sound of the letter "b, the learning system 100 generates the word "bus" wherein the letter "b" is followed by the short "u" sound.

Further, according to the second criterion, the spelling pattern of a speech sound includes a plurality of letters corresponding to a phoneme associated with the speech sound. Additionally, the plurality of letters may be located at an onset position in the spelling pattern. Accordingly, the learning system 100 improves over the traditional learning systems because it focuses on the onset position of the sound. For instance, the traditional learning systems may have used the word "bird" to refer to the r-controlled "ir" sound. However, this may confuse a learner because beginners may focus on the letter "b" in the word "bird" instead of the "ir" sound. Therefore, the learning system 100 uses "earth" to refer to the "er" phoneme. Although "earth" is spelled with "ear" instead of "er", because "ear" in "earth" is pronounced as "erth", the learning system 100 generates the word "earth".

Additionally, in some embodiments, the generating may be based further on a third criterion. According to the third criterion, the spelling pattern may correspond to a high-frequency word that occurs frequently (i.e. statistically) in spoken and/or written language.

Further, the method 200 may include a step 204 of displaying, using the display device 104, one or more sound-letter cards of the first plurality of sound-letter cards based on a predetermined lesson plan. For example, the teacher may create the lesson plan by specifying the first plurality of sound-letter cards for learning the 25 phonemes associated with the letters "a" through "z". Additionally, the predetermined lesson plan may include a sequence in which sound-letter cards of the first plurality of sound-letter cards are displayed on the display device 104. For example, in some embodiments, the predetermined lesson plan may order the sound-letter cards based on corresponding frequency of occurrence in spoken and/or written usage. Accordingly, in some instances, sound-letter cards corresponding to high-frequency phonemes may be displayed first, followed by sound-letter cards corresponding to low-frequency phonemes. Further, in some embodiments, the learning system 100 may be configured to enable the teacher to specify an arbitrary order of displaying the first plurality of sound-letter cards based on pedagogical considerations. Further, in some embodiments, one or more of the learner interface and the teacher interface may be configured to receive a control input that may control displaying of the first plurality of sound-letter cards. For example, the control input may cause display of only the speech sound without the spelling pattern. Subsequently, after a controlled delay, the spelling pattern corresponding to the speech sound may be displayed.

Figure 5:
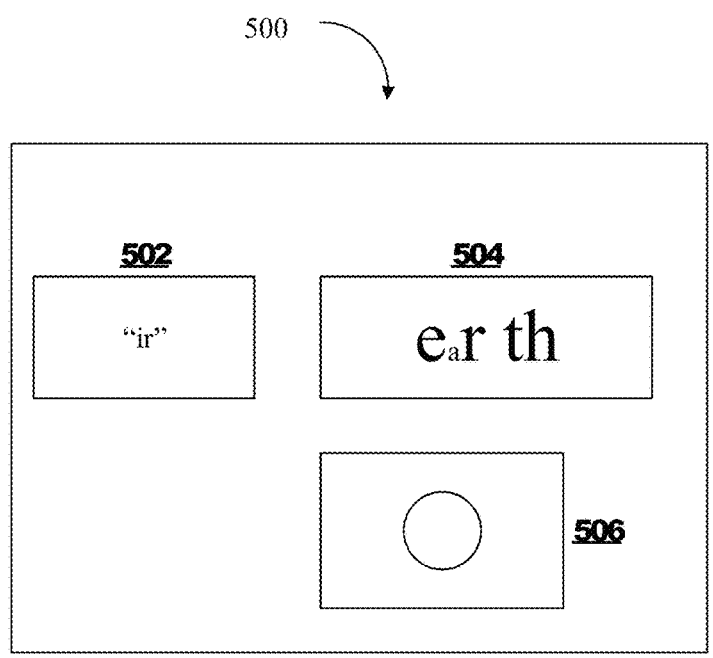
FIG. 5 illustrates a user interface displaying an exemplary sound-letter card according to some embodiments.

Furthermore, in some embodiments, the displaying of the one or more sound-letter cards may be performed by de-emphasizing a visual characteristic of one or more redundant letters in the spelling pattern. The visual characteristic may include, for example, a size, a color, a transparency level etc. Additionally, in some instances, the learning system 100 may be configured to advantageously employ "misspelling" in order to properly and logically teach learners how to read. For instance, the spelling pattern 504 "earth" corresponding to the speech sound 502 "ir" may be displayed on the display device 104 as shown in an exemplary sound-letter card 500 in FIG. 5. As illustrated, the letter "a" is de-emphasized as it has no role in the pronunciation of the spelling pattern. In other words, the spelling pattern may include a misspelled version of a word, such as "earth" in order to facilitate learning. Additionally, in some instances, a plurality of misspellings of a word may be used, such as for example, mu/nny, mo/nny and mo/ney in order to represent speech sound of "money". Accordingly, in some embodiments, the spelling pattern may include visually offset groups of letters associated with syllables of a corresponding word in order to show the separation of syllables within the word.

Further, in such cases, the one or more redundant letters, such as the letter "a", may be displayed so that the learner can perceive the one or more redundant letters in an "unconscious" way. Accordingly, learners can see that, for example, the letter "a" exists in the word "earth" but it does not play any role like the letter "h" in the word "school" since phonetically, "school" may be better spelled as "scool" or "skool". Therefore, in some embodiments, the learning system 100 may not ignore or negate the standard spelling system. It may give learners a way to recognize existence of such letters which do not play a role in pronunciation in the spelling pattern.

Further, in some embodiments of the present disclosure, the learning system 100 may be configured to consider the following points with regard to the onset position of the plurality of letters corresponding to the phoneme associated with the speech sound.

The letters "l", "m" and "n" are the most difficult to pronounce for beginning readers because they have two separate sounds in the onset and rime position.

"L" sound in the onset position→"lu" as in "laugh", "left", "love" etc.

"L" sound in the rime position→"ul" as is "handle", "tunnel", "table' etc.

"M" sound in the onset position→"mother", "make", "messy" etc.

"M" sound in the rime position→"plum", slam", "cream" etc.

"N" sound in the onset position→"nothing", "never", nice" etc.

"N" sound in the rime position→"clean", "plan", "ton" etc.

In all the onset sounds of "l", "m" and "n", the mouth is opened after reading it. In all the rime sounds of "l", "m" and "n", the mouth is closed. The onset sound is far more critical to teach in the beginning stages of reading these letters because in terms of audible comprehension, the onset sounds of "l", "m" and "n" are critical but the rime sounds of "l", "m" and "n" are not nearly as significant.

For example, consider the situational context where a child is looking to drink something from the refrigerator. The child may say the following to the mother:

1. "Mom, is there any soda in a can?"
2. "Mom, is there any soda in a cam?"

Notice that if the mother listens to the statement #2, she may replace "cam" with "can".

In another example, the child may alter the onset sound of the letter "n" versus replacing the letter "n" in the rime position. All things being equal while placing the letter "n" in the beginning or the end, which one is easier to comprehend? This is a simple proof to illustrate that IF we had to PROVE teaching ONLY two letters to a reading student, it is ALWAYS more advantages to teach the first two letters of a 3 letter word rather than the back two letters.

1. "Where is my mon?"
2. "Where is my nom?"

Notice that sentence #2 is very difficult to comprehend.

The following are some tests to demonstrate comparative importance between the onset position and rime position.

Test 1—Pick one of the following choices that sound closer to the word "mom":
a. Mon;
b. b. Nom.

Test 2—Pick one of the following choices that sound closer to the word "mom":
a. Mo_ (maw_);
b. b. _om (_awm).

The experience of the present inventor indicates that, in the above tests, the choice (a) is more likely to be picked. Therefore, in some embodiments, the learning system 100 prefers the onset position rather than the rime position.

Additionally, in some embodiments, the method 200 may further include displaying, using the display device, at least one picture associated with at least one spelling pattern of the at least one of the first plurality of sound-letter cards. Further, the at least one picture may be such that it facilitates pronunciation of the at least one spelling pattern. For example, in displaying a sound-letter card corresponding to the phoneme "oi" or "oy", the spelling pattern of "boy" may be displayed while also displaying a picture depicting an object, such as for example, oil, the pronunciation of which includes the phoneme "oi". Accordingly, the learner may be reminded of the speech sound associated with the phoneme. Similarly, referring to FIG. 5, a picture 506 of planet earth may be displayed in the sound-letter card 500 in order to facilitate pronunciation of the spelling pattern 504 "er th" or "e$_a$r th".

Figure 3:
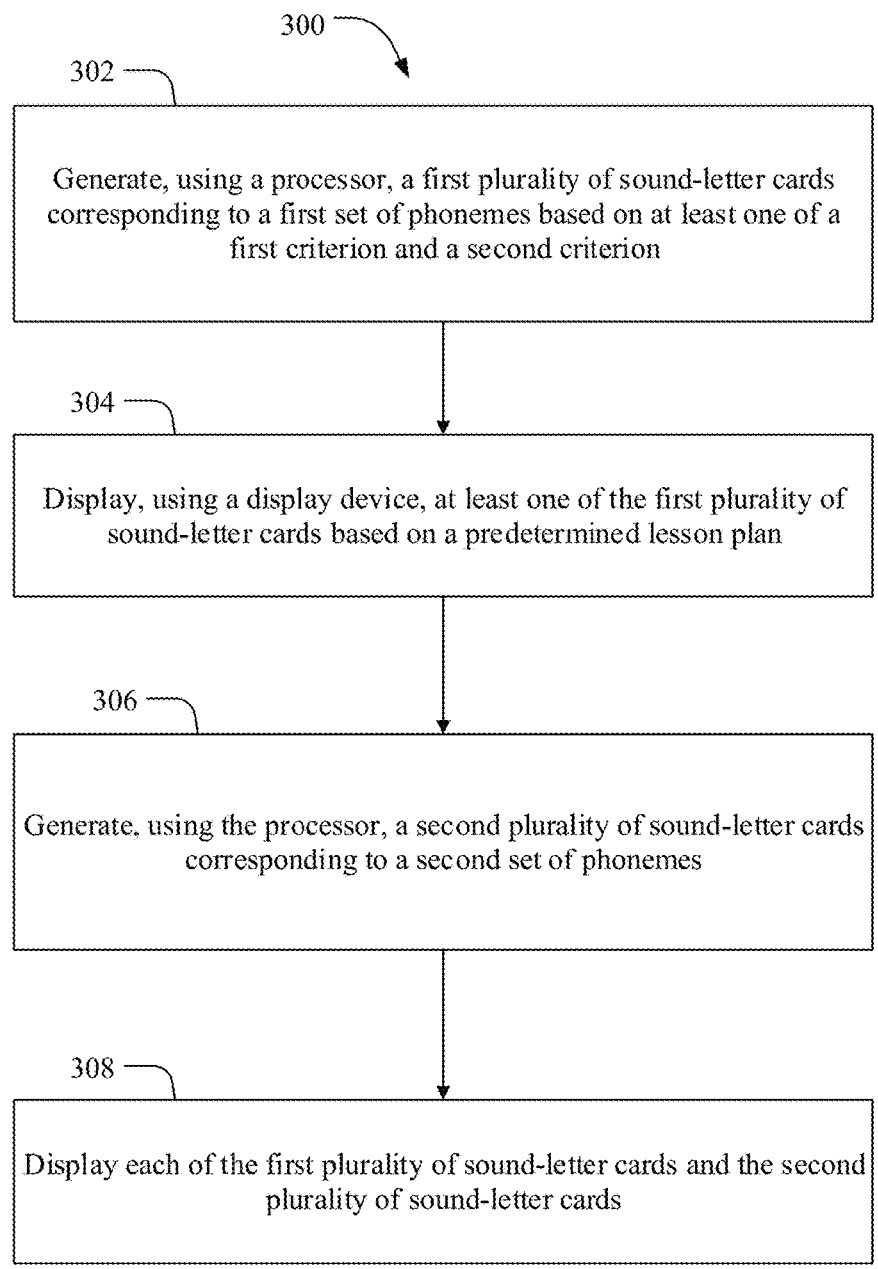
FIG. 3 illustrates a flowchart depicting a method 300 of facilitating learning of correspondence between speech sounds and spelling patterns, in accordance with some other embodiments.

FIG. 3 illustrates a flowchart of a method 300 performable by the learning system 100, in accordance with some other embodiments. The method 300 may include a step 302 of generating the first plurality of sound-letter cards. Further, the method 300 may include a step 304 of displaying the one or more sound-letter cards of the first plurality of sound-letter cards. Details regarding the step 302 and 304 may be understood from description of corresponding steps 202 and 204 provided in relation to FIG. 2.

Further, the method 300 may include a step 306 of generating, using the processor 102, a second plurality of sound-letter cards corresponding to a second set of phonemes. The second set of the phonemes may include, for example, one or more of digraphs, trigraphs, and r-controlled vowels. Further, each sound-letter card of the second plurality of sound-letter cards may include each of a speech sound and a spelling pattern. A digraph denotes a phoneme represented by two letters. Similarly, a trigraph denotes a phoneme represented by three letters. Likewise, an r-controlled vowel denotes a phoneme represented by a vowel followed by an "r". Additionally, the method 300 may include a step 308 of displaying each of the first plurality of sound-letter cards and the second plurality of sound-letter cards. In an instance, the second plurality of sound-letter cards may be displayed to a learner subsequent to the learner having learnt the correspondence between speech sounds and spelling patterns associated with the 25 phonemes corresponding to letters "a" through "z". Accordingly, the method 300 may facilitate learning through a gradual process.

Figure 4:
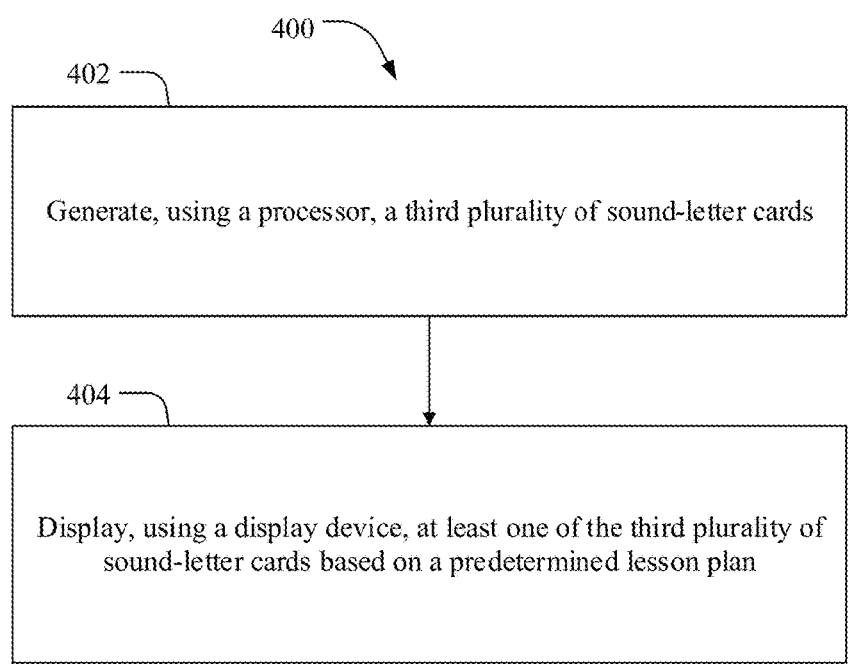
FIG. 4 illustrates a flowchart depicting a method 400 of facilitating learning of correspondence between speech sounds and spelling patterns, in accordance with yet some embodiments.

Further, FIG. 4 illustrates a flowchart of a method 400 performable by the learning system 100, in accordance with some embodiments. The method 400 may include a step 402 of generating, using the processor, a third plurality of sound-letter cards. Each sound-letter card of the third plurality of sound-letter cards may include a word and a spelling pattern. For instance, the word may include a short vowel. Further, the word may conform to a consonant-vowel-consonant (CVC) form. Furthermore, the spelling pattern may include a plurality of letters representing a blending of speech sounds associated with consonant-vowel (CV) part of the CVC form.

For example, the learning system 100 may be configured to partition a CVC word as CV/C rather than C/VC as done in traditional learning systems. While blending as per the C/VC form may appear logical, such as B/at, c/at, f/at, etc., according to the learning system 100, this is unnatural and inefficient for the following two reasons.

Firstly, the learner may not read a word like "bat" as "Bu . . . at". When learners are speaking, they do not say that "I need to play baseball with a Bu-at." Instead, it is much more efficient and easier to teach learners the sound "Ba" and they will comprehend the word in context. For instance, if someone said 'I need a "Ba"' while playing baseball, the listener would assume that a bat was referred to. In another example, if someone said 'My wallet is in my "Ba"' the listener will naturally assume the word was "bag".

The traditional learning system may try to make learn learners blend all the way to the final consonant but the learning system 100 does not. The reason is because if the learner simply learns the "Ba" sound and how to pronounce it, it will eliminate the need to blend all the way to the final consonant. The learner can audibly comprehend every instance of the "Ba" words without having to blend all the way to the final consonant. Therefore, knowing the CV blending of "Ba" is much more streamlined and easier because it will cover every instance of any CVC combination such as, but not limited to, bag, bad, bam, ban, back, and bass.

Figure 6:
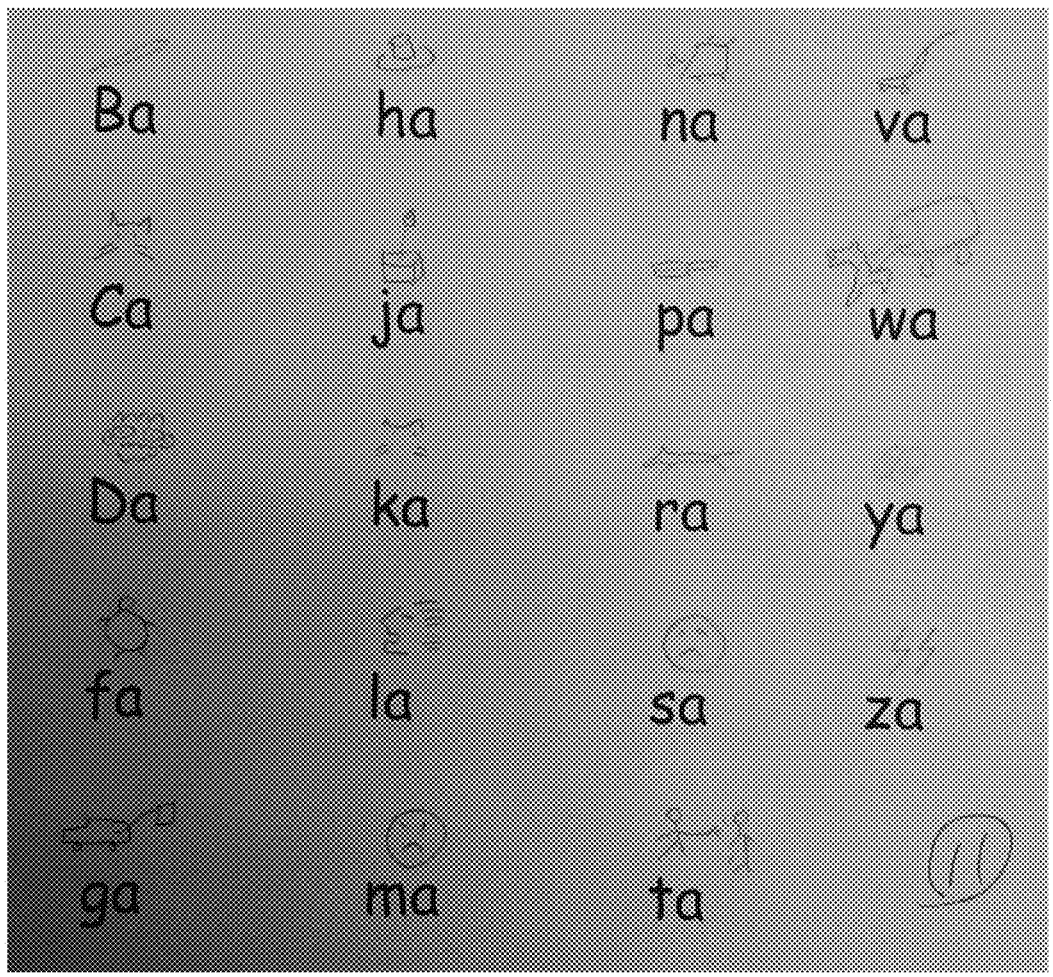
FIG. 6 is a photograph depicting a CV chart for short "a".
Figure 7:
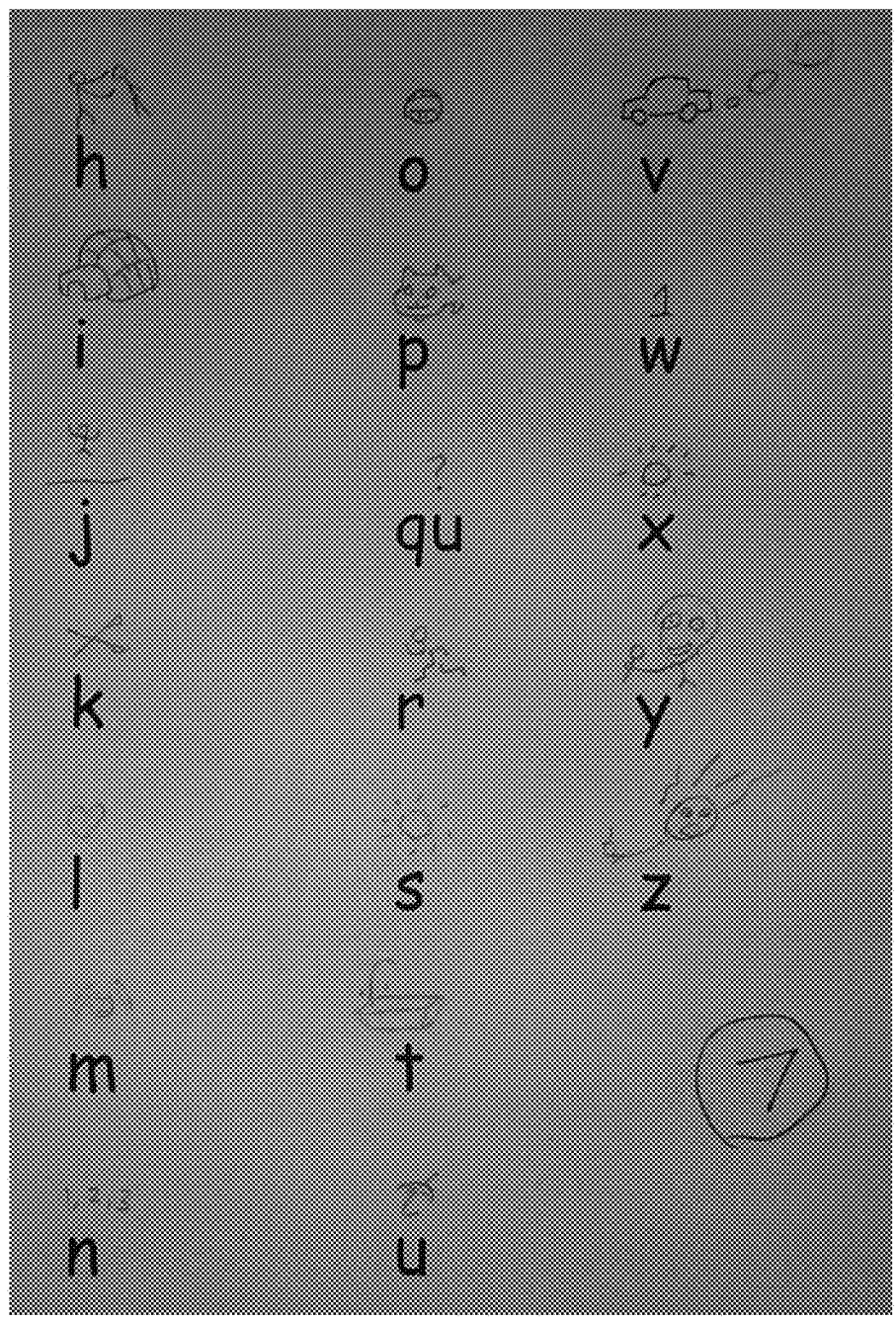
FIG. 7 is a photograph depicting sound spelling cards with the "schwa" sound.
Figure 8:
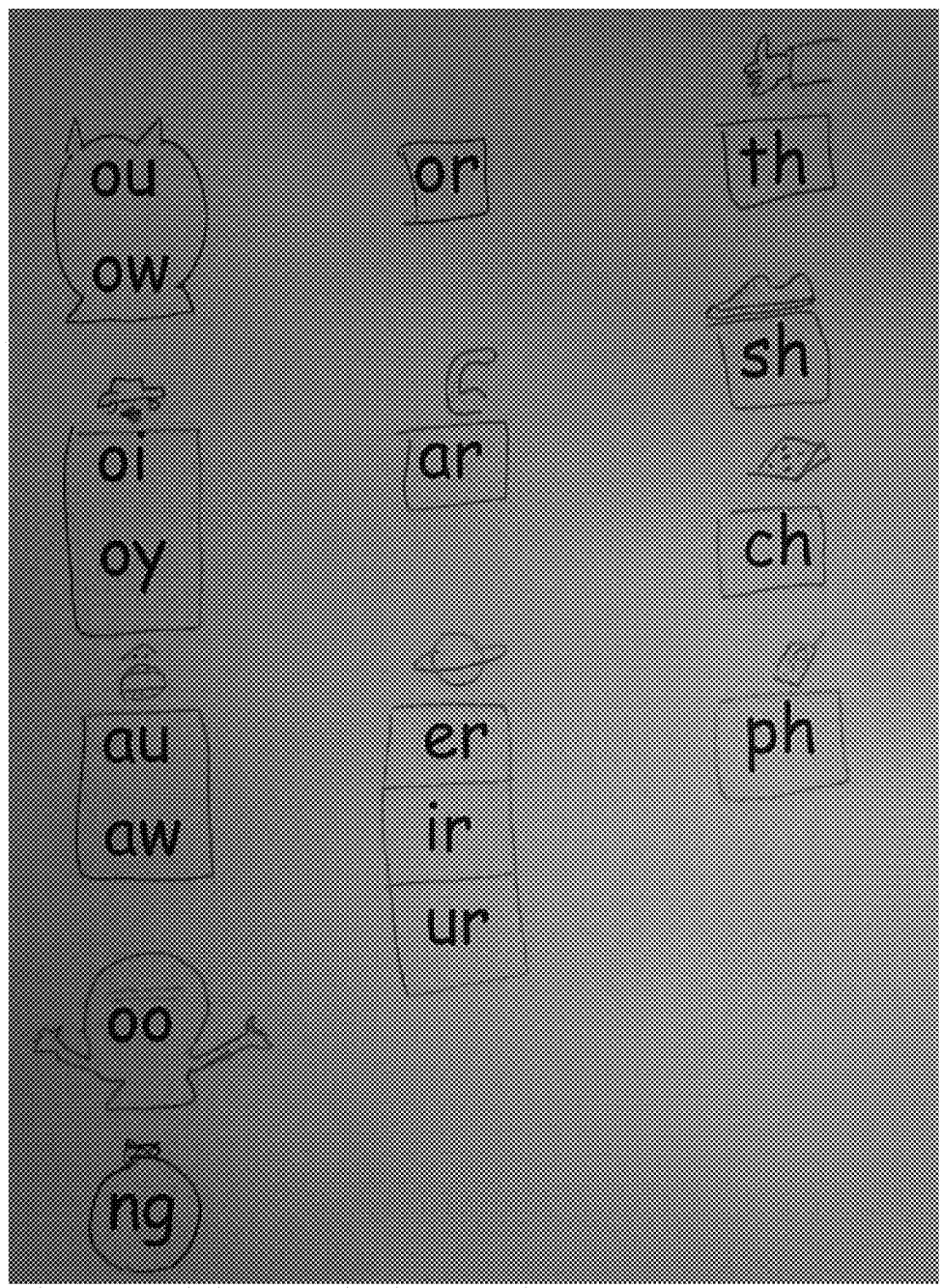
FIG. 8 is a photograph depicting a sample phoneme chart.
Figure 9:
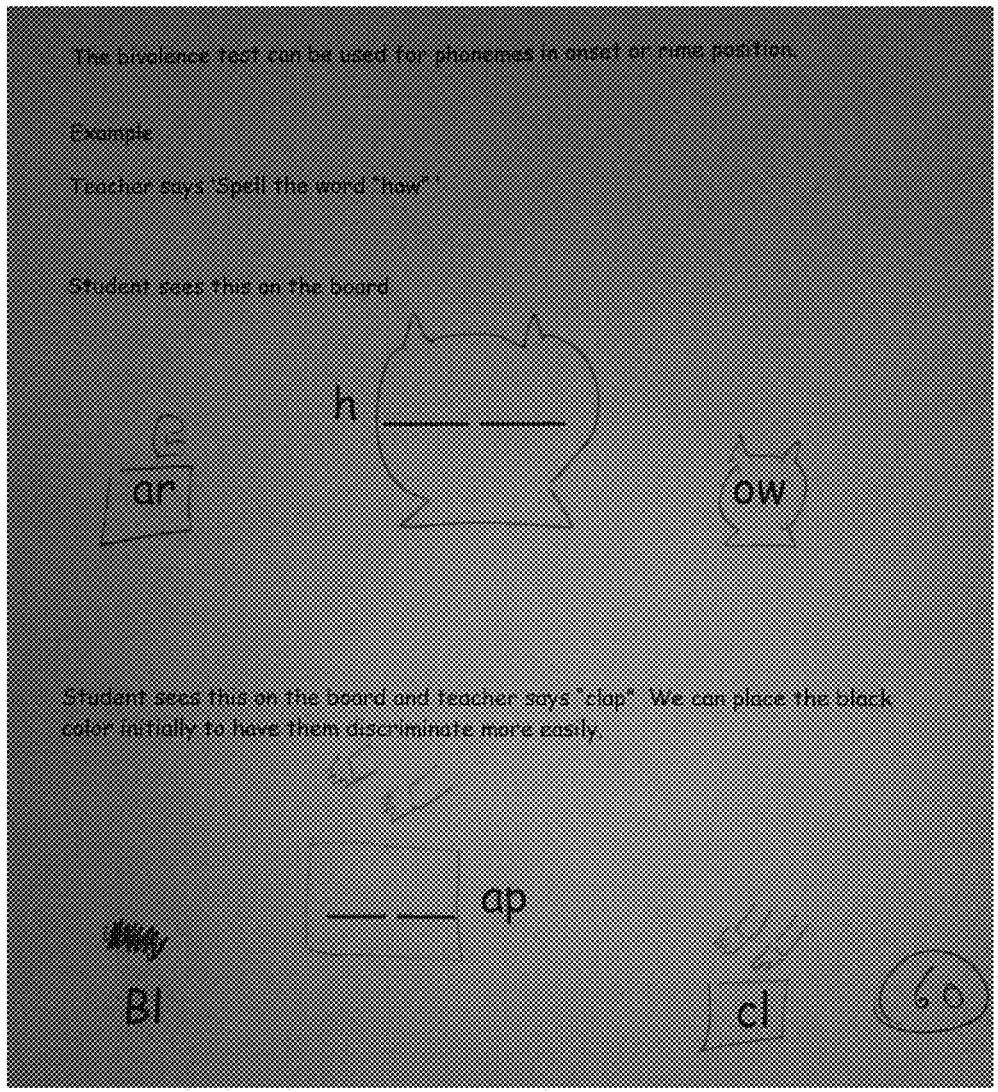
FIG. 9 is a photograph depicting a bivalence spelling test.
Figure 10:
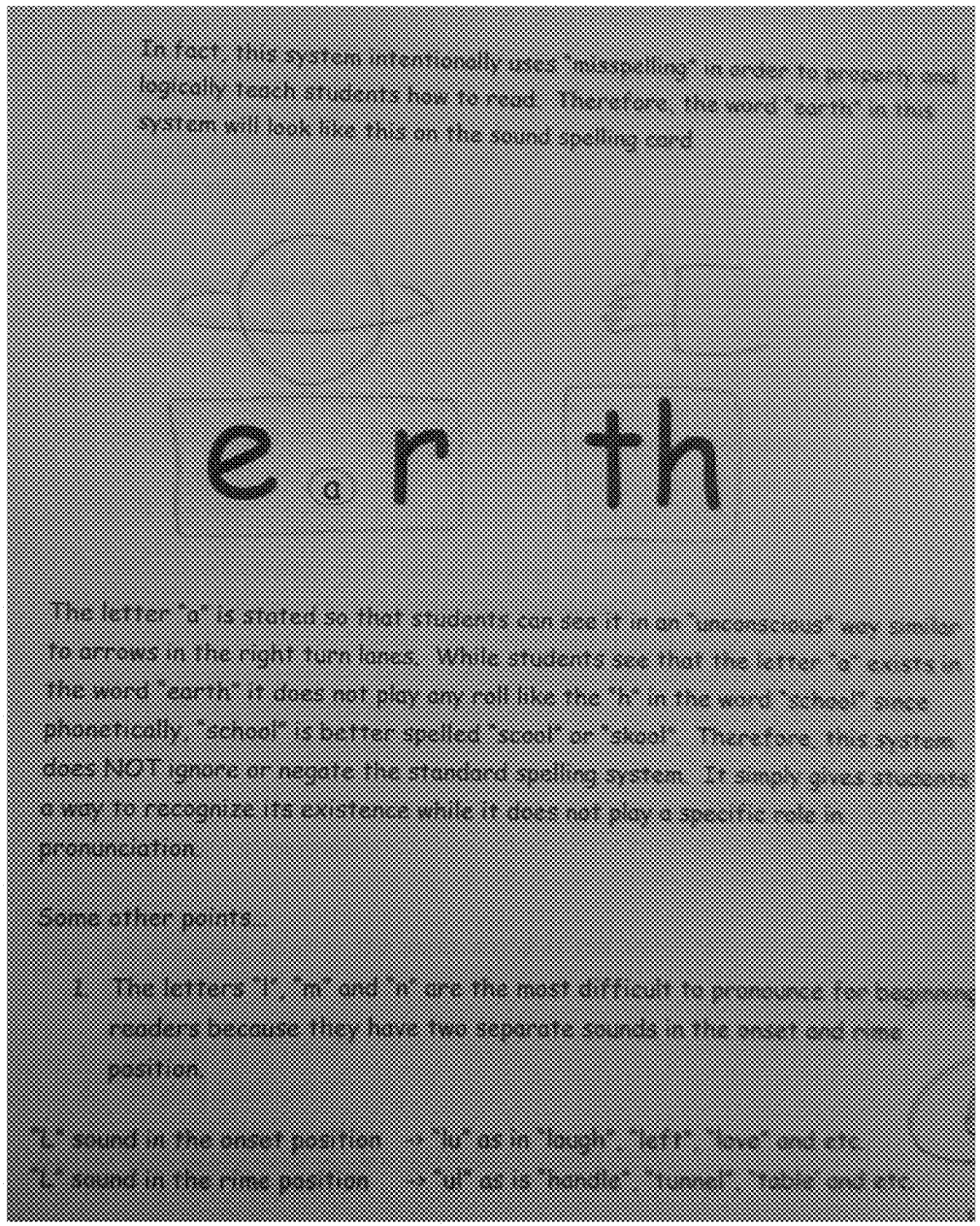
FIG. 10 is a photograph depicting a phonetic spelling method.
Figure 11:
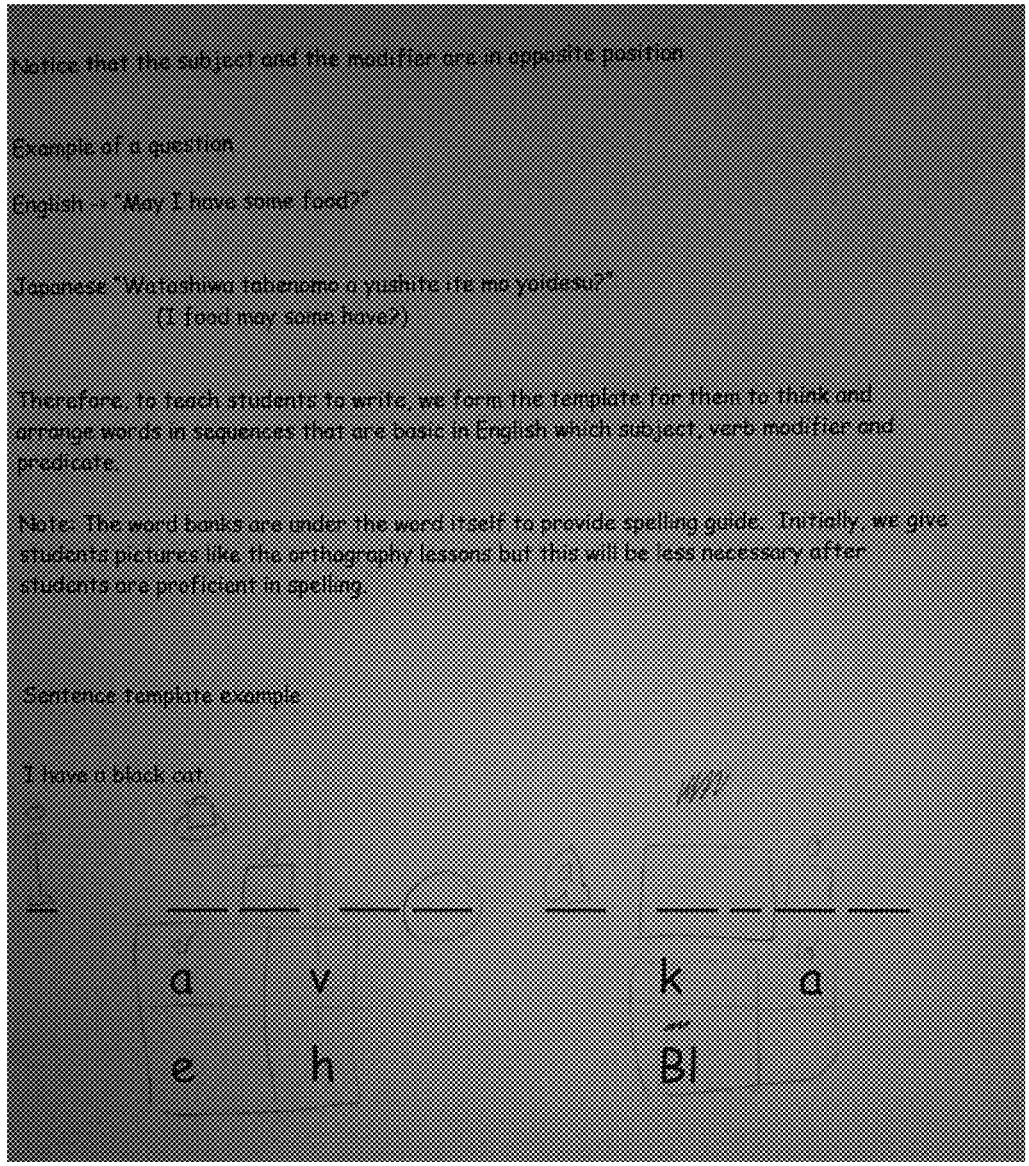
FIG. 11 is a photograph depicting a sentence template.
Figure 12:
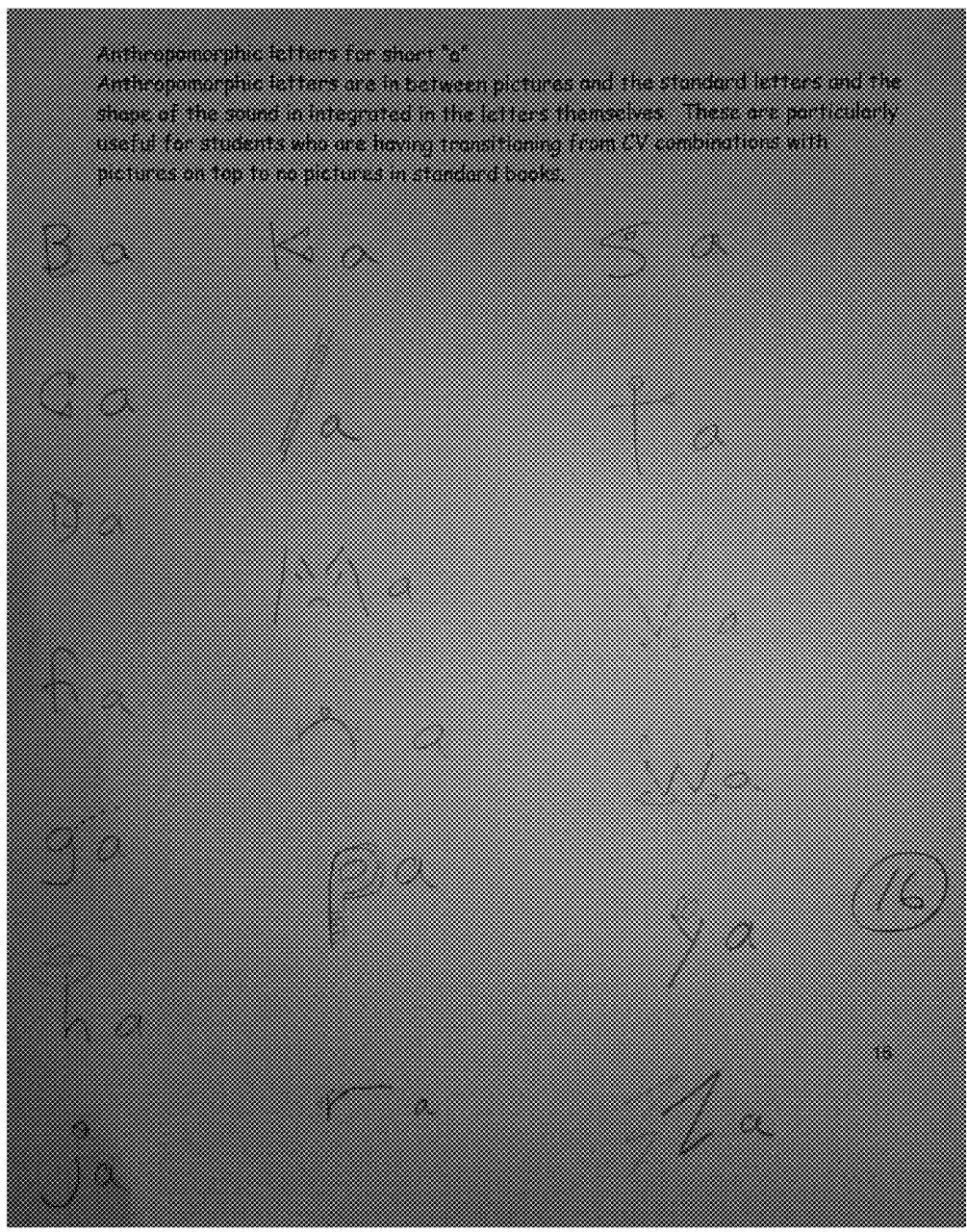
FIG. 12 is a photograph depicting anthropomorphic letters (letters that look like the sound).
Figure 13:
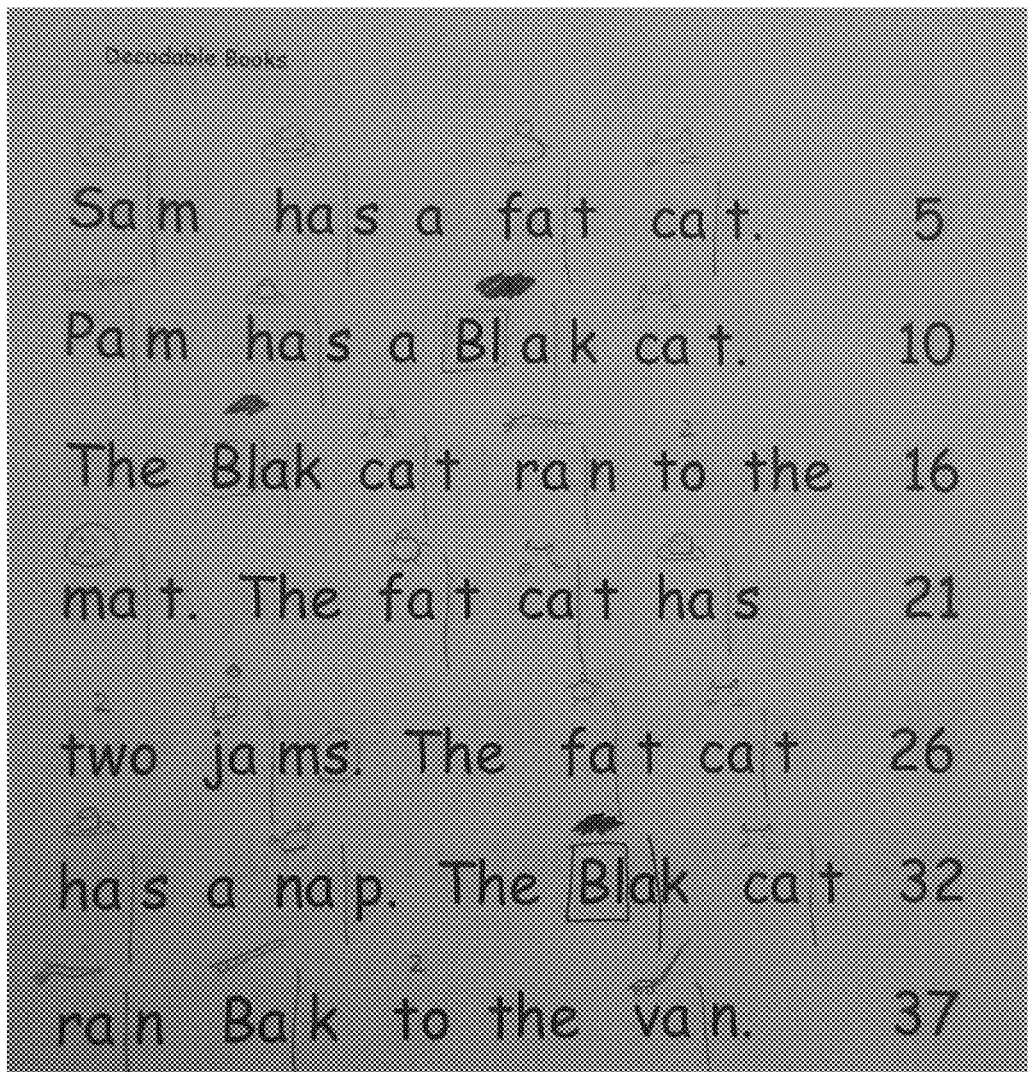
FIG. 13 is a photograph depicting a sample decodable book with pictures and syllable breaks.
Figure 14:
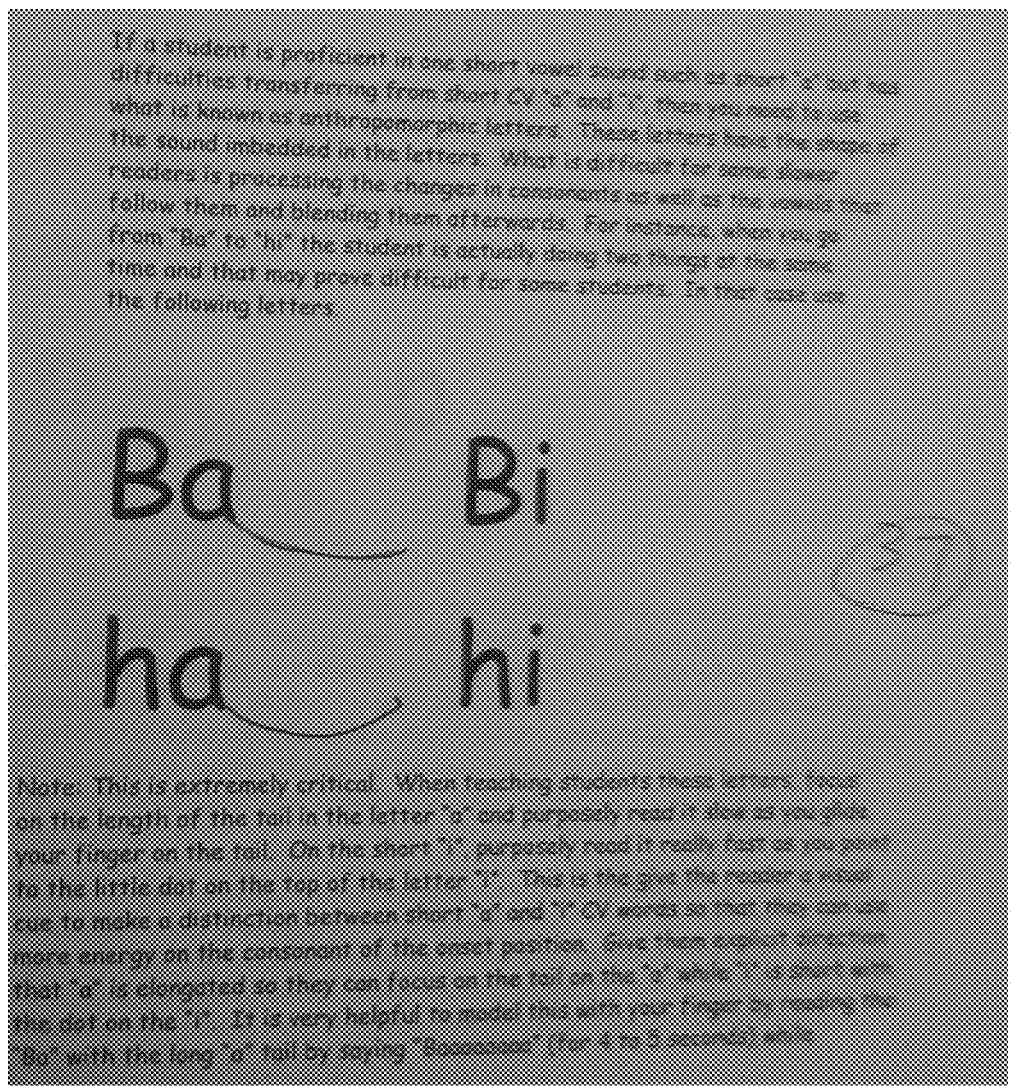
FIG. 14 is a photograph depicting discrimination letters for short "a" vs. short "i".
Figure 15:
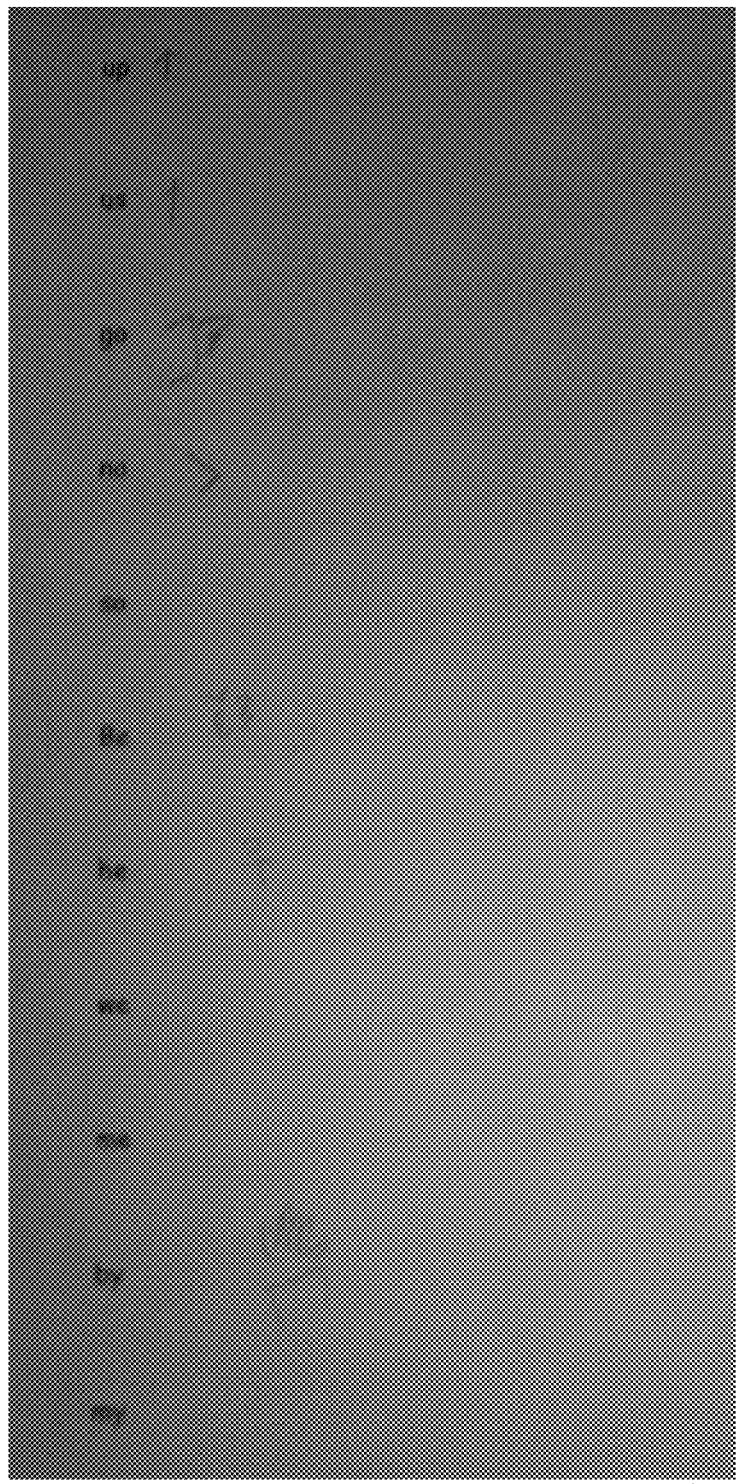
FIG. 15 is a photograph depicting a sample of a high frequency word chart.
Figure 16:
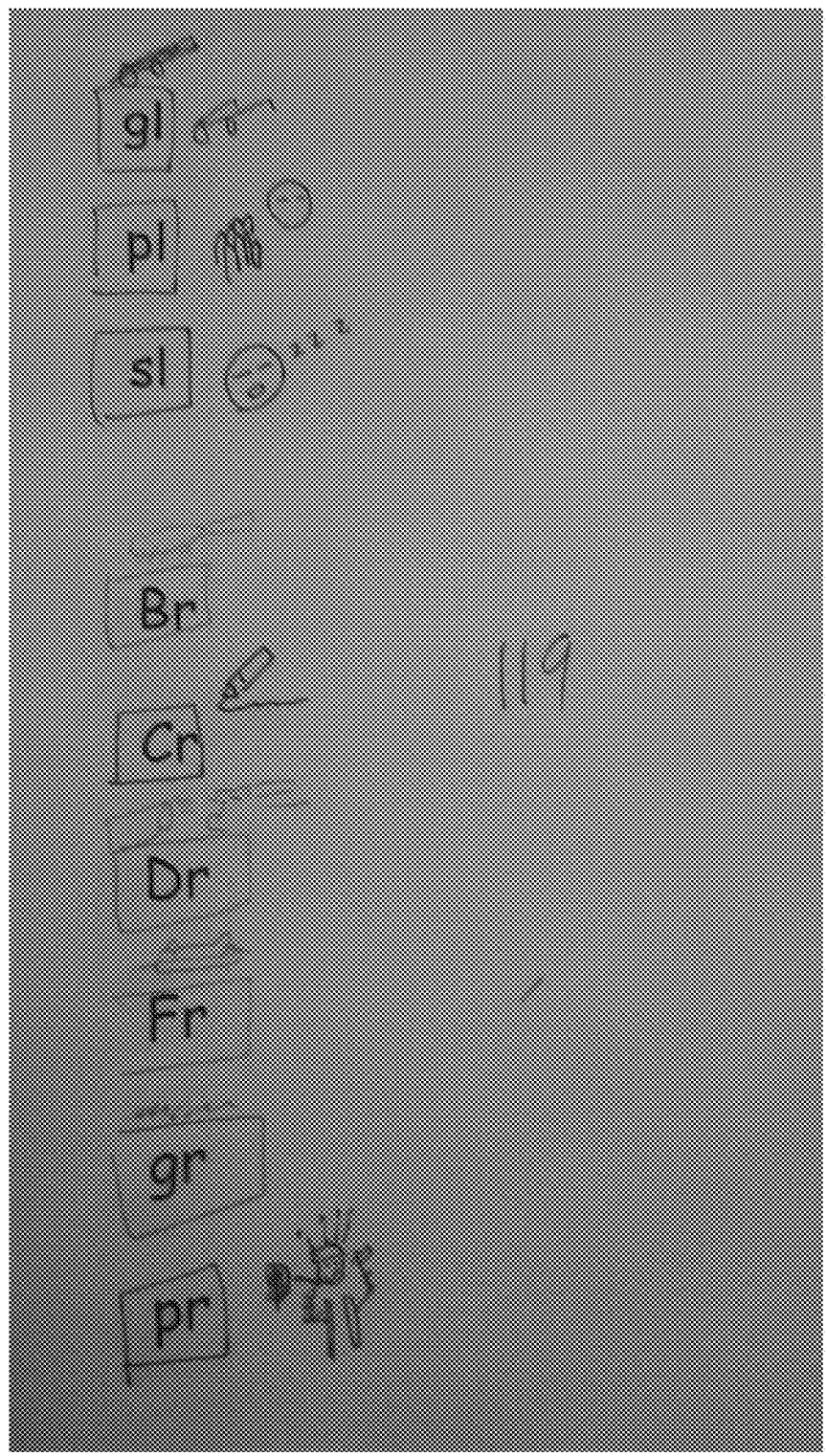
FIG. 16 is a photograph depicting a consonant blend chart.
Figure 17:
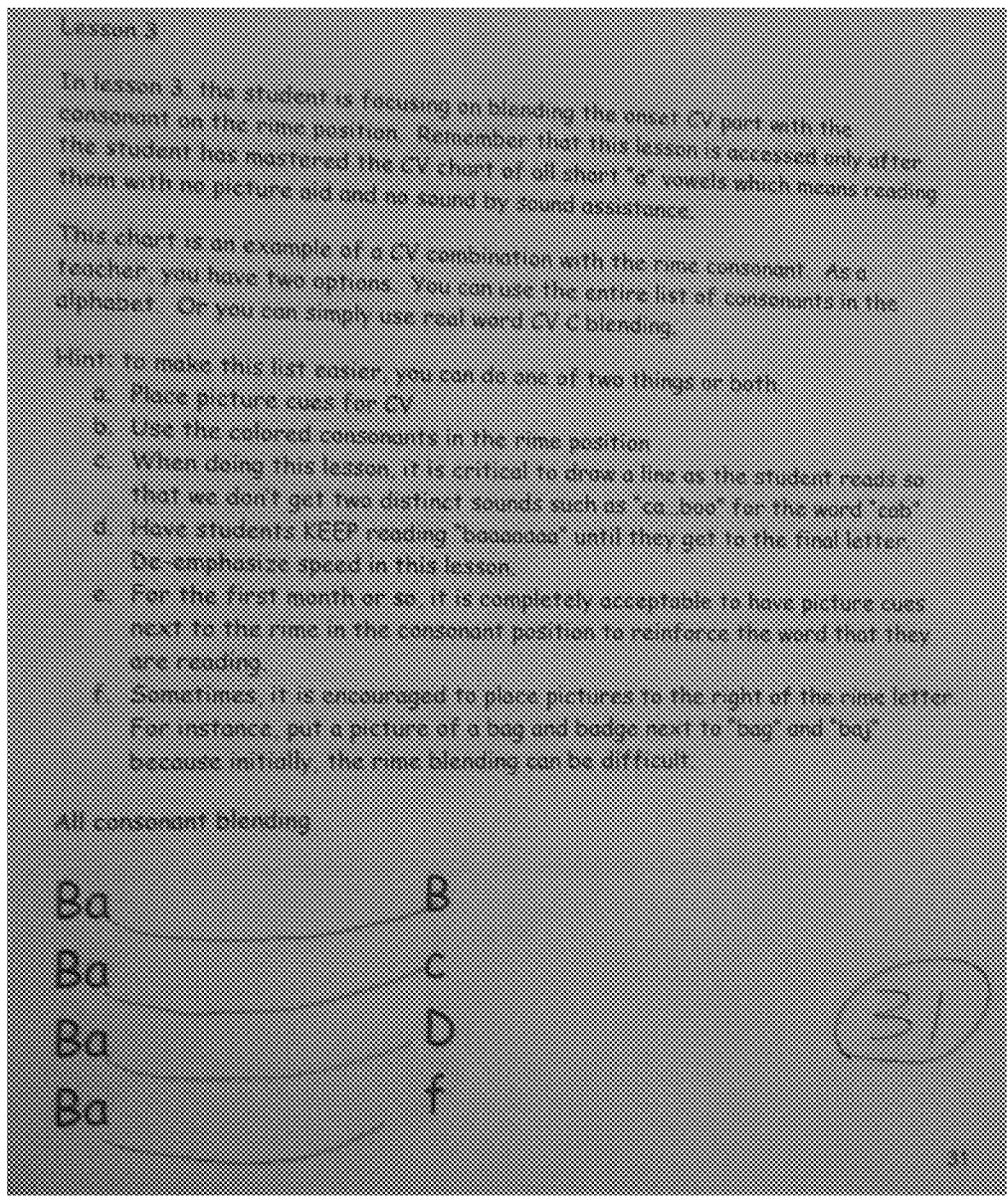
FIG. 17 is a photograph depicting a consonant-vowel to consonant blending chart.

In an exemplary embodiment of the present disclosure, the learning system 100 may facilitate the learner to focus on blending the onset CV part with the consonant on the rime position. However, in some embodiments, the learning system 100 may provide this only after the learner has mastered the CV chart of all short "a" vowels, without taking aid of a picture and/or a sound. FIG. 6 illustrates a chart depicting an example of the CV combination with the rime consonant. Further, the learning system 100 may be configured to allow the teacher to select the entire list of consonants in the alphabet or select those corresponding to real word CVC blending.

Further, the third plurality of sound-letter cards may a first set of sound-letter cards, a second set of sound-letter cards and a third set of sound-letter cards. Further, each word in the first set of sound-letter cards may include a short "a". Similarly, each word in the second set of sound-letter cards may include a short "i". Likewise, each word in the third set of sound-letter cards may include at least one of a long vowel and an r-controlled vowel.

In an instance, once the learner has mastered the CV words with short "a" under a minute, the learner may be ready to read a book. Accordingly, in some embodiments, the learning system 100 may be configured to display the book to the learner on the display device 104. Reading the book may be initiated as soon as on the first day. The book may largely have all short /a/ CV's. Further, the words in the book may be 3-letter CVC words. As an example, if the word is "Sam" the learner may read it as "sa" instead of "Sam" or if the word is "sat" the learner may only read it as "sa". This is acceptable and intentional.

In some embodiments, the learning system 100 may be configured to facilitate mastering of the short "i" CV words before facilitating mastering of the short "a" and "i" CV combinations. As an example, the learning system 100 may generate words like "big", "sit" or "fix". Further, the learner may need to cover CV combinations "bi", "si" and "si" while scanning vertically before horizontally.

Further, the method 400 may include a step 404 of displaying, using the display device 104, the third plurality of sound-letter cards based on the predetermined lesson plan. In some embodiments, the third plurality of sound-letter cards comprising the first, second and third sets of sound-letter cards may be displayed according to the predetermined lesson plan. For example, the displaying at step 404 may include displaying the first set of sound-letter cards, the second set of sound-letter cards and the third set of sound-letter cards in a time order. The time order, may be specified by the predetermined lesson plan and/or provided by the teacher through the teacher interface. For instance, the time order may dictate that the displaying of the first set of sound-letter cards precedes displaying of each of the second set of sound-letter cards and the third set of sound-letter cards.

Further, in some embodiments, displaying of the third plurality of sound-letter cards may include alternately displaying words with different consonants but a common short vowel. For example, the learning system 100 may be configured for alternately displaying "Ba", "Da", "Ca", "Ga", etc. in order to teach the student the short "a".

Additionally, in some embodiments, the displaying of a plurality of sound-letter cards from a selected set of sound-letter cards is performed randomly. Accordingly, the selected set of sound letter cards may be one of the first set of sound-letter cards, the second set of sound-letter cards and the third set of sound-letter cards. For example, the learning system 100 may enable the teacher to select the first set of sound-letter cards and further provide an option to the teacher to enable randomly displaying sound-letter cards from the first set of sound-letter cards.

Further, in some embodiments, the learning system 100 may be configured to display a spelling template including a plurality of symbols selected from the group consisting of a space, a slash, a square and an arrow. Further in some embodiments, the learning system 100 may be further configured for displaying each of a correct phoneme and an incorrect phoneme in conjunction with the spelling template. Additionally, the spelling template may include one or more blank spaces. Accordingly, the learning system 100 may be further configured for receiving a phoneme selection input from a learner interface corresponding to one of the correct phoneme and the incorrect phoneme to complete the one or more blank spaces. In other words, the learner may interact with the learning interface to select one of the correct phoneme and the incorrect phoneme and fill the one or more blank spaces. Further, in some embodiments, the learning system 100 may be further configured for displaying a letter bank comprising a plurality of letters. Furthermore, the learning system 100 may be further configured for receiving a letter selection input from the learner interface corresponding to one of the plurality of letters to complete the one or more blank spaces.

According to the foregoing description, the disclosed method and system provide various advantages. For instance, the learning system 100 facilitates learning of correspondence between speech sounds and spelling patterns in a stage-wise process. Accordingly, in a first stage learners are exposed to the 25 phonemes corresponding to the letters "a" through "z" while subsequently in the second stage, learners are exposed to phonemes associated with digraphs, trigraphs and r-controlled vowels. As a result, learners experience improved learning. Additionally, by ensuring that spelling patterns containing the short "u" are used for facilitating learning speech sounds of a phoneme, learners are able to learn more naturally and easily. Furthermore, by ensuring that the spelling patterns contain the letters corresponding to a phoneme at an onset position, learners are able to speak sooner, while being comprehended reliably.

Although the invention has been explained in relation to its preferred embodiment, it is to be understood that many other possible modifications and variations can be made without departing from the spirit and scope of the invention as hereinafter claimed.

I claim:

1. A method of facilitating learning of correspondence between spelling patterns and speech sounds, the method comprising:
   generating, using a processor, a first plurality of sound-letter cards corresponding to a first set of phonemes, wherein each phoneme in the first set is represented by a single letter of the English alphabet, wherein each sound-letter card comprises a speech sound and a spelling pattern, wherein the generating is based on at least one of a first criterion and a second criterion, wherein according to the first criterion, the spelling pattern corresponding to a speech sound of a letter comprises letters corresponding to a phoneme associated with the letter followed by schwa sound, wherein according to the second criterion, the spelling pattern of a speech sound comprises a plurality of letters corresponding to a phoneme associated with the speech sound, wherein the plurality of letters is located at an onset position in the spelling pattern, wherein the generating is based further on a third criterion, wherein according to the third criterion the spelling pattern corresponds to a high frequency word; and
   displaying, using a display device, at least one of the first plurality of sound-letter cards based on a predetermined lesson plan.

2. The method of claim 1 further comprising:
   generating, using the processor, a second plurality of sound-letter cards corresponding to a second set of phonemes, wherein each phoneme of the second set of phonemes is at least one of a digraph, a trigraph and an r-controlled vowel, wherein each sound-letter card of the second plurality of sound-letter cards comprises each of a speech sound and a spelling pattern; and
   displaying, using the display device, at least one of the second plurality of sound-letter cards based on the predetermined lesson plan.

3. The method of claim 1, wherein the displaying comprises de-emphasizing a visual characteristic of at least one redundant letter in the spelling pattern, wherein the at least one redundant letter has no role in pronunciation of the spelling pattern.

4. The method of claim 3, wherein the visual characteristic comprises a font size.

5. The method of claim 1 further comprising:
   generating, using a processor, a third plurality of sound-letter cards, wherein each sound-letter card of the third plurality of sound-letter cards comprises a word and a spelling pattern, wherein the word conforms to a consonant-vowel-consonant (CVC) form, wherein the spelling pattern comprises a plurality of letters representing a blending of speech sounds associated with consonant-vowel (CV) part of the CVC form; and
   displaying, using the display device, at least one of the third plurality of sound-letter cards based on the predetermined lesson plan.

6. The method of claim 5 wherein the word comprises a short vowel.

7. The method of claim 5, wherein the third plurality of sound-letter cards comprises a first set of sound-letter cards, a second set of sound-letter cards and a third set of sound-letter cards, wherein each word in the first set of sound-letter cards comprises a short "a", wherein each word in the second set of sound-letter cards comprises a short "i", wherein each word in the third set of sound-letter cards comprises at least one of a long vowel and an r-controlled vowel, wherein the displaying comprises displaying the first set of sound-letter cards, the second set of sound-letter cards and the third set of sound-letter cards in a time order, wherein displaying of the first set of sound-letter cards precedes displaying of each of the second set of sound-letter cards and the third set of sound-letter cards.

8. The method of claim 7, wherein the displaying of a plurality of sound-letter cards from a selected set of sound-letter cards is performed randomly, wherein the selected set of sound letter cards is at least one of the first set of sound-letter cards, the second set of sound-letter cards and the third set of sound-letter cards.

9. The method of claim 1, wherein the displaying comprises displaying at least one of the speech sound and the spelling pattern based on a control input received from at least one of a learner interface and a teacher interface.

10. The method of claim 1 further comprising displaying a spelling template comprising a plurality of symbols selected from the group consisting of a space, a slash, a square and an arrow, wherein a symbol of the plurality of symbols visually indicates a separation between two syllables.

11. The method of claim 1 further comprising displaying, using the display device, at least one picture associated with at least one spelling pattern of the at least one of the first plurality of sound-letter cards, wherein the at least one picture facilitates pronunciation of the at least one spelling pattern.

12. The method of claim 1, wherein the spelling pattern comprises a misspelling of a corresponding word.

13. The method of claim 1, wherein the spelling pattern comprises a plurality of misspellings of the corresponding word.

14. The method of claim 7, wherein displaying the third plurality of sound-letter cards comprises alternately displaying words with different consonants but a common short vowel.

15. The method of claim 10 further comprising displaying each of a correct phoneme and an incorrect phoneme, wherein the spelling template comprises at least one blank space, wherein the method further comprises receiving a phoneme selection input from a learner interface corresponding to one of the correct phoneme and the incorrect phoneme to complete the at least one blank space.

16. The method of claim 15 further comprising displaying a letter bank comprising a plurality of letters, wherein the method further comprises receiving a letter selection input from the learner interface corresponding to one of the plurality of letters to complete the at least one blank space.

17. The method of claim 1, wherein the spelling pattern comprises visually offset groups of letters associated with syllables of a corresponding word in order to show the separation of syllables within the word.

* * * * *